April 29, 1958      P. J. J. TERCE      2,832,279
APPARATUS FOR THE MAKING OF COFFEE
Filed April 18, 1956
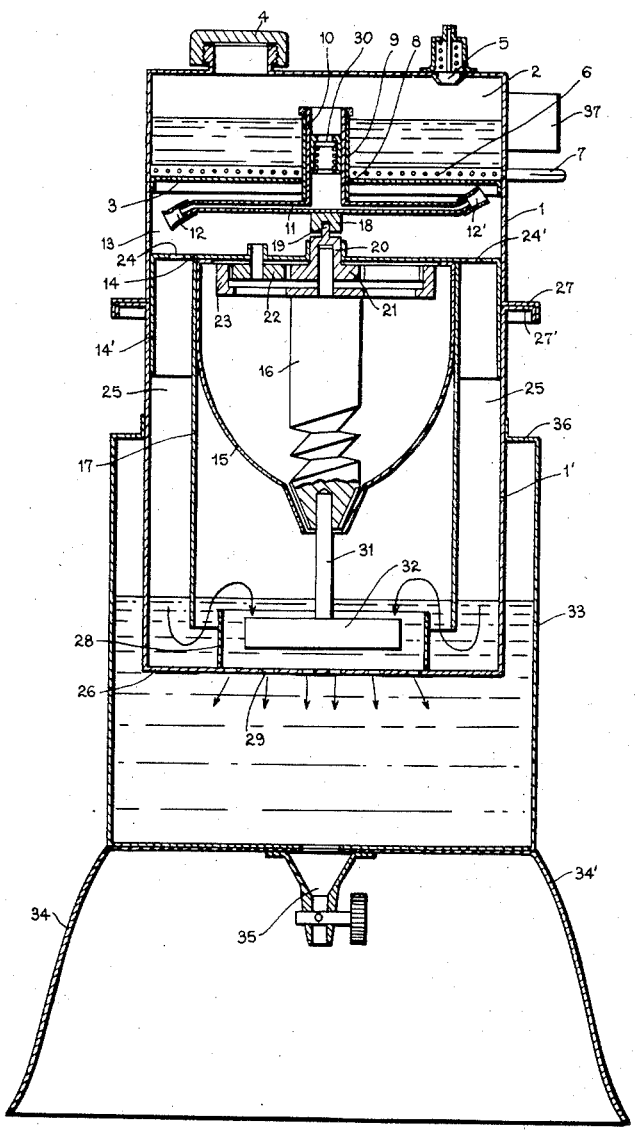
Inventor:
Paul Joseph Jean Tercé

2,832,279

APPARATUS FOR THE MAKING OF COFFEE

Paul Joseph Jean Terce, Paris, France, assignor to Societe d'Etudes, de Recherches et d'Applications Mecaniques, Boulogne sur Seine, France, a corporation of France Application April 18, 1956, Serial No. 579,047

Claims priority, application France April 22, 1955

5 Claims. (Cl. 99—286)

The present invention relates to a new apparatus for the making of the coffee directly from the coffee-beans and it is characterized in that it is constituted by a coffee-mill integral with a coffee-pot and delivering the ground coffee directly to the filter of this coffee-pot, the coffee-mill being preferably driven by a steam engine, the expanded steam of which is used for the percolating.

The steam necessary for the steam engine driving the coffee-mill is supplied by a small boiler, also integral with the apparatus. The steam engine can be a piston-engine, an elemental turbine, a disc provided with nozzles or a reaction-wheel constituted by a tube fixed perpendicularly upon the shaft of the turbine, supplied with steam at its center and crank-shaped at its both ends in the shape of nozzles.

Of course, instead of having the coffee-mill driven by a steam turbine, the expanded steam of which is used to warm up the water intended to make the coffee, it is also possible, without departing from the scope of the invention, to have the coffee-mill driven by an electrical motor which will drive at the same time a pump or a propeller for producing the flow through the ground coffee of water heated by a source of heat, inside or outside the apparatus. Nevertheless, according to the preferred form of embodiment of the invention the water serving to the production of the coffee is warmed up by the steam flowing out of the turbine which drives the coffee-mill and a circulation by convection of the water thus warmed up is established through an immersed filter.

By way of example, a form of embodiment of the invention is described hereafter and illustrated in the annexed drawing showing an axial elevation section.

As shown in the drawing, the apparatus is constituted by a cylindrical container 1 including at its upper portion a compartment 2, closed by a bottom 3 and forming the boiler. The cover of the compartment is provided with a filling plug 4 and a safety valve 5 and the bottom 3 supports an electric heating spiral resistance wire 6 ending in external connection plugs 7. In a central aperture 8 in the bottom 3 is set a tube 9 in which is journaled the tubular shaft of a steam reaction wheel, constituted by a tube 11 having two crank-shaped ends upon which are located nozzles 12, 12'. The cross sectional area of the neck of the nozzles is selected, in relation to the power generated, to obtain in the boiler 2 a pressure of several times that of atmospheric pressure, for instance 57 to 71 pounds per square inch at 150° C. The turbine 11, 12, 12', is arranged in a second compartment 13 of the container, closed by a removable bottom 14 with a cylindrical flange 14'. Upon the lower surface of this bottom 14 is located a coffee-mill, of the usual type for instance, with a hopper 15 containing the coffee beans and a rotating grinder provided with an Archimedian screw, 16, the whole being surrounded by a cylindrical casing 17 open at its lower end and attached to the bottom 14 of the compartment of the turbine. When a coffee-mill of the usual type as above mentioned is used, the turbine drives this coffee-mill through a reduction gear. Therefore, the short arm 18, integral with the tube 11 of the turbine, bears a coupling notch engaged by the blade of screw-driver 19, provided at the end of an axle 20 journaled in the wall 14 and bearing a pinion 21 meshing with an idler 22 meshing with a toothed ring 23 integral with the grinder 16 of the mill. For a coffee-mill of another type, requiring a driving torque less powerful in normal running order, instead of the reduction gear, a progressive friction clutch can be provided or an elastic coupling equipped with a spring tightened during the starting of the turbine to make this starting easier. In addition, in the bottom 14 of the compartment 13 are provided apertures 24, 24' . . . allowing the steam flowing out of the nozzles 12, 12' of the turbine to pass into the annular chamber 25 provided between the container 1 and the casing 17 of the mill. The bottom 26 of the container 1 is made in two separable parts 1, 1' in order to permit the mill to be filled and cleaned, these parts being coupled by the flanges 27, 27'. The bottom 26 bears a filter constituted by a cylindrical flange 28 having an upper edge which is above and inside the lower edge of the casing 17, thus forming a baffle. Inside the flange 28, the bottom 26 is provided with apertures 29, to allow the flow of the water through the filter as it will be explained later on. The grinder 16 of the mill extends in a shaft 31 bearing a paddle 32 rotating in the filter 28, 29, in which the mill discharges the ground coffee coming from the hopper 15. A suitable device will couple the paddle with the axle of the mill only when all the coffee is ground. The container 1, 1', is immersed, up to a level higher than the level of the filter, in water contained in a separate container or preferably in a container 33 coupled with the main container 1, 1'. This container can be supported by legs 34, 34' and is provided with a cock 35 at its base. The container is provided with an aperture 36 communicating with the atmosphere to submit it to the air pressure.

A thermostat 37, controlled by the temperature of the wall of the boiler 2, disconnects the resistance wire 6 as soon as all the water is evaporated and the wall becomes too hot.

The working of the apparatus above described is as follows:

When the water contained in the boiler 2 starts boiling, the steam flows in the turbine and starts it rotating. Preferably, a valve 30, fitted in the tubular shaft of the turbine, allows the steam to flow only when the pressure has reached a given value. The ground coffee falls into the filter 28 while the steam flowing out of the turbine is driven back in the annular chamber 25, condenses when coming into contact with the water contained in the lower container and warms this water up to a temperature neighbouring 100° C., thus creating by convection a flow of the warm water through the filter 28, acording to the direction of the arrows. The heat and the essence of the coffee thus produced are diffused simultaneously in all the mass of water contained in the container 33. After a few minutes of this active circulation, the coffee is thoroughly made and brought to the suitable temperature.

What I claim is:

1. An apparatus for the making of the coffee including a cylindrical container, at the upper portion of this container a compartment forming a boiler, a safety valve in one of the outer walls of said boiler, a heating resistance placed upon the lower wall of said boiler, a tube crossing through said lower wall of the boiler, a hollow shaft journaled in said tube, the upper end of said hollow shaft communicating with the boiler, a valve disposed in the central channel of said shaft and adjusted to open only when the pressure in the boiler raises above a given value, a second compartment placed below the boiler, a steam turbine arranged in said compartment, supported and fed with steam by the hollow shaft, a reduction gear driven by said turbine, a shaft in prolongation of the shaft of the turbine and driven by the reduction gear, a grinder to grind the coffee, fixed at the lower end of said shaft, a cylindrical casing surrounding said shaft and its grinder, provided to receive the coffee beans and including an aperture below the grinder for the discharge of the ground coffee, an annular chamber surrounding said casing, conduit openings between said annular chamber and the compartment of the turbine, apertures in the region of the bottom of the cylindrical container below the grinder, a flange perpendicularly fixed upon this bottom, surrounding the apertured region, the upper edge of this flange being above and inside the lower edge of the inner cylindrical wall of the annular chamber, a second cylindrical container open at its upper portion and partly filled up with water in which is dipped the lower portion of the first container up to a level such that the flange is entirely immersed, openings establishing the communication of the upper portion of said container with the atmosphere.

2. In an apparatus for the making of coffee, a container comprising a first chamber forming a boiler and provided with heating means to produce steam under pressure, a second chamber located adjacent the first chamber, a steam turbine located in said second chamber, supply means to feed to the steam turbine the steam under pressure produced in said boiler, a third chamber, a coffee-mill located in said third chamber and driven by said steam turbine, a filter arranged in the lower part of said third chamber below the mill to directly receive the ground coffee discharged from the mill, means to discharge the expanded steam escaping from the turbine into said filter, and a fourth chamber located below said filter to collect the percolated coffee flowing through said filter.

3. In an apparatus for the making of coffee, a container comprising a first chamber forming a boiler and provided with heating means to produce steam under pressure, a second chamber located adjacent the first chamber, a steam turbine located in said second chamber, supply means to feed to the steam turbine the steam under pressure produced in said boiler, a third chamber, a coffee-mill arranged in said third chamber and driven by said steam turbine, said third chamber having a bottom perforated in its central portion to form a filter to receive ground coffee discharged from said mill, a fourth chamber located below said filter, said container being fillable with water to a level located above said filter, and means to discharge the expanded steam escaping from the turbine into water covering said filter whereby a flow of hot water is caused to flow through said filter into the fourth chamber.

4. In an apparatus for the making of coffee, a container comprising a first chamber forming a boiler and provided with heating means to produce steam under pressure, a second chamber located adjacent the first chamber, a steam turbine located in said second chamber, supply means to feed to the steam turbine the steam under pressure produced in said boiler, a third chamber, a coffee-mill located in said third chamber and driven by said steam turbine, said third chamber having a bottom perforated in its central portion, an annular collar located around said perforated portion to form a filter to receive ground coffee discharged from the mill, a fourth chamber located below said filter and fillable with water to a level located above the upper edge of said collar, a partition in said third chamber surrounding the mill and having its lower edge immersed in the water around said collar and below the upper edge thereof, and means to discharge the expanded steam escaping from the turbine into an annular space formed between said partition and the outer wall of said third chamber, whereby hot water is circulated through said filter.

5. In an apparatus for the making of coffee, a container comprising a first chamber forming a boiler and provided with heating means to produce steam under pressure, a second chamber located near the first chamber, a steam turbine located in said second chamber, supply means to feed to the steam turbine the steam under pressure produced in said boiler, said turbine having a reaction wheel comprising a hollow rotatable shaft one end of which is journaled on the boiler, a horizontal tube centrally attached to the other end of said hollow shaft, crank-shaped portions located at the opposite ends of said tube to form nozzles outwardly tapering in opposite directions, the cross-sectional area of said nozzles being sufficiently large to maintain inside the boiler a steam pressure of several times that of atmospheric pressure, a third chamber, a coffee-mill located in said third chamber and driven by said steam turbine, said third chamber having a bottom perforated in its central portion, an annular collar located around said perforated portion to form a filter to receive ground coffee discharged from the mill, a fourth chamber located below said filter and fillable with water to a level located above the upper edge of said collar, a partition in said third chamber surrounding the mill and having its lower edge immersed in the water around said collar and below the upper edge thereof, and means to discharge the expanded steam escaping from the turbine into an annular space formed between said partition and the outer wall of said third chamber, whereby hot water is circulated through said filter.

References Cited in the file of this patent

UNITED STATES PATENTS

| 1,067,336 | Hay | July 15, 1913 |
| 2,014,325 | Grilli | Sept. 10, 1935 |

FOREIGN PATENTS

| 14,460 | Great Britain | 1905 |
| 382,151 | Germany | Sept. 29, 1923 |
| 606,520 | Germany | Dec. 4, 1934 |